April 5, 1932.    F. W. MERRILL    1,852,817
SPEED REGULATING SYSTEM
Filed Nov. 12, 1929
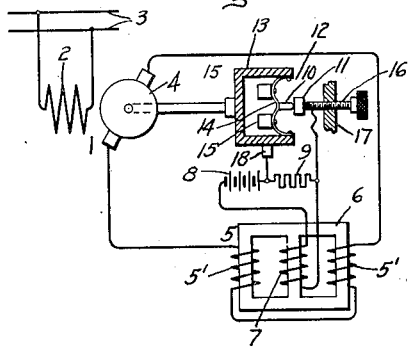
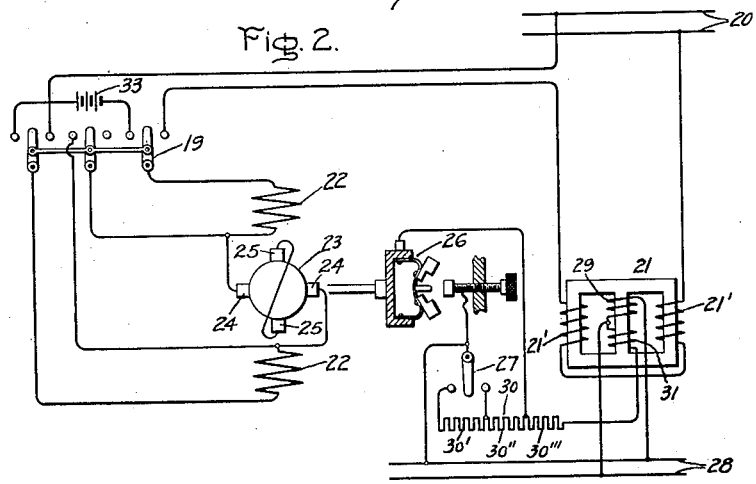
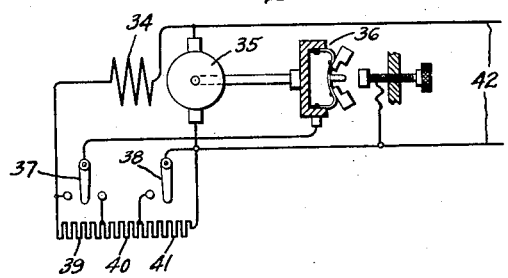
Inventor:
Frank W. Merrill,
by Charles E. Tullar
His Attorney.

Patented Apr. 5, 1932

1,852,817

UNITED STATES PATENT OFFICE

FRANK W. MERRILL, OF FORT WAYNE, INDIANA, ASSIGNOR TO GENERAL ELECTRIC COMPANY, A CORPORATION OF NEW YORK

SPEED REGULATING SYSTEM

Application filed November 12, 1929. Serial No. 406,684.

My invention relates to regulating systems and more particularly to systems for regulating the speed of electric motors.

In many applications of electric motors for power purposes it is desirable that their speed regulation be closer than the inherent speed regulation it is possible to incorporate into the motors by even the most careful and expensive design with this end in view. One such application is in connection with the projectors for talking moving pictures, where substantially constant speed is necessary for satisfactory reproduction. It has therefore become necessary to provide such motors with some kind of speed regulating means and as constant speed is the ultimate goal, such regulating means should not only keep close speed regulation for changes in load, but should also tend to keep the motor speed constant regardless of variations in electrical conditions of the source of electrical energy supplying the motor. Such regulators therefore usually embody some type of speed responsive mechanism.

It is an object of my invention to provide a new and improved speed regulating system for electric motors. Another object of my invention is to provide a new and improved adjustable speed regulating system for electric motors in which it is possible to vary the regulated speed between certain upper and lower limits by fine vernier-like adjustment.

My invention will be better understood from the following description taken in connection with the accompanying drawings, and its scope will be pointed out in the appended claims.

In the drawings Fig. 1 is a diagrammatic representation of my invention as applied to an uncompensated repulsion motor, Fig. 2 is a diagrammatic representation of another embodiment of my invention as applied to a compensated repulsion motor which is equipped with dynamic braking means, while Fig. 3 represents diagrammatically a further embodiment of my invention as applied to a direct current shunt motor.

Referring to Fig. 1, 1 is an uncompensated repulsion motor, whose field winding 2 is connected to an alternating current supply circuit 3 and whose armature 4 is short circuited through a variable impedance device which as shown comprises coils 5' wound on the two outer legs of a three-legged iron core 6. Means are provided for varying the impedance of the coils 5', and for this purpose I employ a coil 7 which is wound on the center leg of the core 6 and connected in series with a source of direct current, shown as a battery 8, and a resistance 9. Arranged to short circuit resistance 9 are movable contact 10 and fixed contact 11 of a centrifugal switch 12. This switch comprises a cup-shaped element 13 of conducting material which, as shown, is coupled to the armature of motor 1 so as to be rotated about its axis. Carried by cup 13 is a strip of resilient material 14 to which are fastened weights 15 and contact 10. Contact 11 is carried by adjusting screw 16 which is supported by insulated member 17. Brush 18 serves as one terminal for the switch, adjusting screw 16 being the other. With contacts 10 and 11 touching, the current through coil 7 is of such magnitude as to saturate the core 6. When, however, contacts 10 and 11 are moved apart resistance 9 is inserted in the circuit with battery 8 and coil 7, thereby decreasing the current through coil 7 and decreasing the saturation in core 6.

The operation of the embodiment shown in Fig. 1 is as follows: As the motor 4, energized from source 3, increases in speed, weights 15, due to the centrifugal force applied to them, tend to move radially outward, thereby, due to the shape of the spring 14, causing contact 10 to be moved inwardly away from contact 11. This has the effect of decreasing the saturation of core 6 and thereby increasing the reactance of coils 5' in the armature circuit of the motor. This increase in reactance causes the motor to slow down, when contacts 10 and 11 will again touch, short-circuiting the resistance 9, thereby increasing the direct current flux saturation in the core which again decreases the reactance of the coils 5', in the armature circuit of the motor and causes the motor to increase in speed. By adjusting screw 16 it is therefore possible accurately to adjust the speed at which it is desired to operate the motor.

While the above explanation of the operation of the centrifugal switch 12 gives a correct idea of the circuit changes involved, it must be understood that this switch or speed regulator element actually vibrates at a comparatively high rate—15 to 30 times per second or more, maintaining the average value of direct current saturation in the core which is necessary to hold the reactance of coils 5′ at the right point to maintain the motor at the speed for which the adjustment screw 16 has been set. If the voltage of line 3 rises, tending to increase the speed of the motor, the regulator weights 15 move outward very slightly still vibrating at the same rate, but remaining open for a larger percentage of the vibrating cycle. In this way the average direct current saturation of the core is reduced and the reactance of the coils 5′ is increased sufficiently to maintain the speed under the condition of higher voltage. If the motor and reactor are of correct design to take care of extreme load and voltage changes, and resistance 9 has been chosen properly to energize coil 7, then the regulating system will function properly under all operating conditions.

In Fig. 2 my invention is shown as applied to a compensated repulsion motor. In this figure 19 is a triple pole switch which when moved to the right completes the operating circuit of the motor and when moved to the left breaks the circuit and completes the necessary circuits for dynamic braking of the motor that will be hereinafter described. In this figure, assuming switch 19 to be moved to the right, a circuit is completed from alternating current supply source 20 through reactance coils 21′, field coils 22 and armature 23, through exciting brushes 24 and back to the other terminal of the supply. Working brushes 25 are short circuited. Centrifugal switch 26 differs from switch 12 in Fig. 1 in that it is designed to separate its contacts upon decreasing speed rather than increasing speed. This is accomplished by the particular way the spring member supporting the centrifugal weights is formed and the way the weights are attached to this spring. Switch 27 is employed for the purpose of selecting the amount of resistance to be connected in parallel with regulator 26. Assuming this switch to be moved to the right the following circuits are traceable. From one side of the direct current source of supply 28 through coil 29, back to the other side of the source of supply 28; also from the first side of source 28 through switch 27, resistance sections 30″ and 30‴ of resistance 30, through coil 31, and back to the other side of source 28. Coil 29 is designed to maintain core 6 in a saturated condition and coil 31 is designed to oppose the magnetomotive force of coil 29 and weaken its magnetizing effect. When switch 27 is moved to the left an additional resistance 30′ is inserted in the last mentioned circuit.

In explanation of the above, the purpose of the differential arrangement of coils 29 and 31 is to permit the use of the type of regulating switch 26 which separates its contacts with decreasing speed. Such a switch has its contacts open when the motor is at rest and only closes them with very light regulating pressure at the operating speed. Everything else being equal the contacts of such a switch will be subject to much less mechanical wear than will those of the inverted type shown as switch 12 in Figure 1. In the case of switch 12 the contacts are subject to high pressures during the starting and stopping period of the motor when the speed is below the regulating point which causes an undesirable amount of contact wear. The electrical energy to be expended in the regulator circuit is greater with the double coil arrangement shown in Fig. 2 than with the single coil of Fig. 1, for the same physical size of reactor, but the advantage of reduced mechanical wear outweighs the disadvantage of increased electrical load in many applications in which the electrical load is so small anyway as not to be a limiting factor. It is evident from the above that a single direct current coil could be used on the reactor of Fig. 2, providing the type of regulating switch were changed to that shown in Fig. 1, if such an arrangement were desired.

Assuming that the motor 23 has been energized from source 20 by moving switch 19 to the right, that switch 27 has also been moved to the right, and that the contacts of regulator 26 are out of engagement due to the motor being at rest, the operation is as follows:

The motor will be increasing in speed because when the contacts of regulator 26 are open, resistance sections 30″ and 30‴ will be in circuit with coil 31, thereby reducing the current in this coil to such a value that its opposing effect to coil 29 will be small. Therefore, the iron core will be somewhat saturated and there will be a low value of reactance in the motor circuit. However, when the speed reaches a predetermined value, as determined by the setting of the regulator adjustment the contacts of switch 26 will close, thereby short-circuiting resistance section 30″ and increasing the current in coil 31, thereby tending to decrease the saturation of the core and increase the reactance in the motor circuit. This in turn will cause the motor speed to decrease when the contacts of switch 26 will open and the above cycle of operations will be repeated. If switch 27 is moved to the left an additional resistance section 30′ is inserted in the circuit of coil 31 and the contacts of regulator 26 will then operate to short-circuit the two sections 30' and 30". The purpose of this is to increase the speed range over which the device will operate. Thus when switch 27 is moved to the right, resistance section 30' is not included in the circuit and regulator 26 operates across resistance section 30" only. If, now, it is desired to adjust the motor speed by means of the adjustable screw on switch 26 it will be found that the range of adjustment by this means is limited between the two speeds the motor would have if resistance 30" were continuously in the circuit with coil 31 and if it were continuously short-circuited. For example, if the adjustment screw of switch 26 is turned so as to move the adjustable contact inwards a point will be reached when the centrifugally operated contact will not leave the adjustable contact because the motor will not run any slower, as resistance 30''' is continuously in circuit with coil 31. Also, if the adjustable contact is screwed outwards the point will be reached when the centrifugally operated contact will not be able to engage it for the motor can not run any faster than when resistances 30" and 30''' are continuously in circuit with coil 31. If, however, switch 27 is turned to the left, the centrifugal switch 26 operates over resistances 30' and 30" and the range of adjustment is increased. The reason that switch 27 is not always turned to the left is that in this position considerable oscillations in speed of the motor are produced, because as switch 26 operates across a larger resistance the periodic current change in coil 31 will be greater and hence the periodic changes in the reactance of the motor circuit will be greater. While this is not particularly objectionable in connection with picture projection, it produces what are known in the art as "wow-wows" when sound reproduction is attempted. Therefore, when reproducing sound, switch 27 is turned to the right, so that regulator 26 only operates across resistance 30".

When switch 19 is moved to the left the circuit containing the supply 20 and the reactance coils 21' will be broken and the following circuits will be completed. The two center contacts of this switch will operate to short-circuit the brushes 24 while the other contacts of this switch will connect a source of direct current illustrated as a battery 33 across the field winding. When both of these circuits are completed the motor will be dynamically braked and brought to rest quickly.

Referring to Fig. 3, I have illustrated an embodiment of my invention as applied to a direct current shunt motor having field winding 34 and armature 35 actuated from direct current source 42. In this figure the centrifugal regulator switch 36 is of the same construction as that employed in Fig. 2 and the terminals of this switch connect to the movable elements of manually adjustable switches 37 and 38. Resistance sections 39, 40 and 41 are in series with the field 34 of the shunt motor. With the switch arms of switches 37 and 38 turned inwards so as to connect the contacts of regulator switch 36 across resistance element 40, resistance element 41 is short-circuited and the operation is as follows: As the motor comes up to speed the contacts of switch 36 will finally touch each other, thereby shunting resistance section 40 and increasing the current to field 34 of the motor which has the effect of reducing the speed of the motor. As the speed falls the contacts of regulator 36 become disengaged, thereby reinserting resistance 40 and again increasing the speed of the motor. It must be remembered that while the above description gives a correct idea of the circuit changes involved that the action of regulating switch 36 is really very rapid as heretofore described. If this motor is being operated to run a talking moving picture projector the above mentioned position of switches 37 and 38 will correspond to the proper speed range of the projector when the pictures are accompanied by the sound reproduction. If now both switches 37 and 38 are turned to the left regulator 36 will operate on both resistances 39 and 40, resistance 41 still being short-circuited by switch 38. This will be the position of the switches corresponding to slow speed picture projection and if a higher speed picture projection is desired, both switches 37 and 38 may be turned to the right, thereby putting resistance sections 40 and 41 under the control of regulator 36 and leaving one resistance section 39 permanently in the field circuit.

While I have shown and described a particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a circuit comprising a source of alternating current, an electric motor and a reactor, said reactor having a magnetizable core, a second circuit comprising a source of direct current and a winding on the core of said reactor for maintaining said core in a magnetically saturated condition, a third circuit comprising said source of direct current, a resistance and a coil on said reactor core whose magnetizing effect opposes that of the saturating winding, and means responsive to the speed of said motor for short circuiting a portion of said resistance when the motor speed exceeds a predetermined value and for opening said short-circuit when the motor speed is below said predetermined value.

2. In combination, an electric motor, a source of current connected to said motor, a saturable reactor connected to control the speed of said motor, a circuit having a resistance which determines the saturation of said reactor, a switch responsive to the speed of said motor for short-circuiting a portion of said resistance when the motor is operating at one side of a predetermined speed and for opening said short-circuit when the motor is operating at the other side of said predetermined speed, means for adjusting the value of said predetermined speed, and means for varying the relative proportion of said resistance which is short-circuited by said switch.

3. In combination, an electric motor, a source of current connected to said motor, a saturable reactor connected to control the speed of said motor, a circuit having a resistance which determines the saturation of said reactor, a switch responsive to the speed of said motor for short-circuiting a portion of said resistance when the motor is operating above a predetermined speed and for opening said short circuit when the motor is operating below said predetermined speed, means for adjusting the value of said predetermined speed, and means for varying the relative proportion of said resistance which is short-circuited by said switch.

4. In combination, a circuit including a source of alternating current, an electric motor and a reactor having a magnetizable core, means normally maintaining said core magnetically saturated, an additional circuit including a source of direct current, a resistance, and a coil wound on the core of said reactor, the magnetizing effect of said coil being in opposition to said saturating means, a switch responsive to the speed of said motor, means connecting the contacts of said switch to two points in said resistance, said switch closing when the motor speed exceeds a predetermined value and opening when the motor speed is below a predetermined value, means for adjusting the speed at which said switch closes, and means for varying the magnitude of the resistance short-circuited by said speed responsive switch whereby after the speed responsive switch has been adjusted to close at a predetermined speed the magnitude of the resistance across the speed responsive switch contacts may be adjusted so that the opening and closing of said switch will reduce to a minimum the oscillations in speed of said motor.

In witness whereof I have hereunto set my hand this 8th day of November, 1929.

FRANK W. MERRILL.